(12) United States Patent
Zabinski

(10) Patent No.: US 8,637,162 B2
(45) Date of Patent: Jan. 28, 2014

(54) LAYERS DURABLY BONDED TO SURFACES

(75) Inventor: Jeffrey S. Zabinski, Yellow Springs, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 200 days.

(21) Appl. No.: 12/741,282

(22) PCT Filed: Mar. 31, 2009

(86) PCT No.: PCT/US2009/038931
§ 371 (c)(1),
(2), (4) Date: May 4, 2010

(87) PCT Pub. No.: WO2009/124034
PCT Pub. Date: Oct. 8, 2009

(65) Prior Publication Data
US 2010/0255336 A1  Oct. 7, 2010

(51) Int. Cl.
| | |
|---|---|
| *B32B 9/00* | (2006.01) |
| *B32B 15/04* | (2006.01) |
| *B05D 5/08* | (2006.01) |
| *B05D 3/12* | (2006.01) |
| *B05D 1/36* | (2006.01) |
| *B01J 35/02* | (2006.01) |
| *B01J 23/00* | (2006.01) |
| *B01J 27/057* | (2006.01) |
| *B01J 27/04* | (2006.01) |
| *B01J 20/00* | (2006.01) |

(52) U.S. Cl.
USPC ........... 428/615; 428/457; 428/688; 428/704; 428/433; 428/408; 428/702

(58) Field of Classification Search
None
See application file for complete search history.

(56) References Cited

U.S. PATENT DOCUMENTS

| | | | | |
|---|---|---|---|---|
| 2,990,294 | A * | 6/1961 | Long | 428/339 |
| 4,099,200 | A * | 7/1978 | Koutalides | 257/666 |
| 5,407,590 | A * | 4/1995 | Salvia | 427/185 |
| 6,815,400 | B2 * | 11/2004 | Jee et al. | 508/113 |
| 2002/0183209 | A1* | 12/2002 | Jee et al. | 508/113 |
| 2007/0012356 | A1* | 1/2007 | Nanu et al. | 136/264 |
| 2008/0159671 | A1* | 7/2008 | Leonardelli | 384/129 |
| 2008/0213467 | A1* | 9/2008 | Yu et al. | 427/74 |
| 2009/0181236 | A1* | 7/2009 | Anderson et al. | 428/323 |

* cited by examiner

*Primary Examiner* — Vera Katz
(74) *Attorney, Agent, or Firm* — AFMCLO/JAZ; Fredric Sinder

(57) ABSTRACT

A method and class of bond coat is provided that physically and chemically bonds solid layer lubricants and other functional coatings to a substrate by burnishing, for example, selected soft materials, including oxides such as antimony trioxide, against the substrate. The new method and bond coat is a major improvement over conventional bonding or coating methods. The process is non-vacuum at ambient temperatures, requiring no binders, adhesives, curing or baking. Lubricant performance can be enhanced by orders of magnitude compared to when the bond coat and burnishing process are not applied. The method is inexpensive, environmentally friendly, applicable to any substrate material, and scalable.

1 Claim, 3 Drawing Sheets

Coating 3-D Objects

LAYERS DURABLY BONDED TO SURFACES

STATEMENT OF GOVERNMENT INTEREST

The invention described herein can be manufactured and used by or for the U.S. Government for governmental purposes without the payment of any royalty thereon.

CROSS-REFERENCE TO RELATED APPLICATIONS

This application is a 35 U.S.C. § 371 National Stage application from International Application No. PCT/US2009/038931, filed Mar. 31, 2008, which claimed the benefit of Provisional Application No. 61/123,566, filed Apr. 1, 2008. This application claims the benefit of the filing dates of both prior applications.

FIELD OF THE INVENTION

This invention relates to methods for durable binding of a layer to a surface including a functional layer and the layered product so prepared.

BACKGROUND OF THE INVENTION

Friction is the resistance of one solid sliding over another solid; often the higher the friction the greater the wear of materials. The best way to reduce friction and wear is by separating the surfaces; this can be accomplished by the use of a liquid lubricant such as oil. The ideal condition is known as hydrodynamic lubrication and can eliminate wear by fully separating materials by a fluid film. Ideal conditions of hydrodynamic lubrication are rarely maintained in practice. Starting, stopping, misalignment, heavy loads and other conditions can cause the fluid film to be squeezed out, or allow surface asperities to break through the lubricant film, so that the two solids are pressed into contact with one another. Ideal hydrodynamic lubrication ends, and elastohydrodynamic or boundary lubrication begins. If no liquid is present the surface is either self lubricated (no lubrication) or a solid lubricant can be used. Solid film lubrication is a critical enabling technology employed in the absence of liquid lubricants. The choice to forgo a liquid lubricant or grease can be either by design constraints or by operating conditions being too severe for liquid and grease survival. Extreme operating conditions are typically defined by severe environments (e.g., water, chemicals), temperatures, and pressures. Extreme operating conditions require a distinct and separate class of lubricants. The harsh environment of outer space or internal combustion engines is marked by such extreme conditions and has spurred the development of a special class of lubricants which are not organic based. The extreme operating conditions found in space sometimes preclude the use of conventional liquids and greases. Solid film lubricants have been very successful in fulfilling the role of providing wear protection in such conditions. Relative to liquid lubricants, solid lubricants generally have lower vapor pressures, better boundary lubrication properties and relative insensitivity to radiation effects, and operate in wider temperature ranges.

Successful solid film lubricants are characterized by the following properties:
  low shear strength
  high adhesion
  low abrasivity
  thermo-dynamic stability.

For moving mechanical components these properties are essential to reduce metal on metal contact and thereby reduce friction, heat, and wear. Much work has been done in identifying materials which have the above properties. Generally, but not exclusively, there are 3 distinct classes of soft solid film lubes meeting these criteria:
  Graphite (DLC, although carbon based, is not a soft solid film)
  Dichalcogenides of molybdenum and tungsten
  Soft Metals Graphite Graphite is the stable form of carbon. The bulk lubricating properties of graphite have been known as early as 1906 and the dichalcogenides as early as 1939. [3] Graphite is used extensively in the electrical industry for its good lubrication properties as well as its good electrical conductivity. Graphite is a durable, heavy-duty lubricant that can endure extreme temperature fluctuations ranging from −100 C to 350 C. Graphite has a sheet like structure where the atoms all lie in a plane and are only weakly bonded to the graphite sheets above and below. The C—C bond is strong in 2 dimensions but weak in the third with a hexagonal crystal orientation. Much like a deck of playing cards, the sheets slide easily. Graphite provides the best wear protection in the presence of moisture.

Dichalcogenides of Molybdenum and Tungsten

The dichalcogenides of molybdenum and tungsten meet the successful solid film lubricant criteria very well and have been used extensively and successfully on most space missions (vacuum & temperature extremes) since the late 60's. $MoS_2$ is a naturally occurring mineral, formed and mined with other ores in various parts of the world. It is highly refined and processed into 0.5-micron average particle size at which time it can be used as a solid lubricant. It possesses the properties of being able to withstand extremely high load capacities up to 600 ksi. It is chemically stable, has a very low coefficient of friction, 0.05 to 0.09, in powder form and has thermo-stability from cryogenic temperatures to 350 deg. C. $MoS_2$ is an ideal solid film lubricant material for extreme environments.

On an atomic level the dichalcogenide lubricants, have a hexagonal crystal structure with strong cation bonded layers creating a basal plane sandwiched between two weekly bonded anions (Van der Waals forces). The net effect is similar to a deck of cards sliding parallel to the long axis, the sliding axis, producing very low friction between mating surfaces. As a rule of thumb $MoS_2$ is the preferred lubricant for vacuum/cryogenics and graphite works the best in air, graphite relying on moisture to induce the proper shear.

The first major milestones in thin solid film lubricant technology are when T. Spalvins in 1967 at NASA Lewis, first reported on the properties of sputter vacuum deposited $MoS_2$ films and subsequently B. C. Stupp in 1968 started to commercially provide PVD deposited $MoS_2$ coatings in Dayton, Ohio. PVD processing resulted in the highest adhesion solid film lubricant coatings.

Soft Metals

In addition to the dichalcogenide and graphite lamellar type films, soft metals such as Au, Ag, In, Cr, Pb can provide wear protection under extreme conditions and meet the requirements of successful solid film lubrication. Soft metallic lubricants have crystal structures with multiple slip planes and do not work-harden appreciably during sliding contacts. Dislocations and point defects generated during shear deformation are rapidly nullified by the frictional heat produced during sliding contact. Reported friction coefficients of soft metals range from 0.1 to 0.4, depending on the metal and test conditions. Ion-plated lead films are extensively used in Europe. In solar array drives alone, more than 2 million operational hours in orbit have been accumulated. An important property of the lead film is its high load-carrying ability. Under Hertzian contact, the as-deposited film flows plastically until a thin film (10 Nm thickness or less) remains and then elastically deforms the substrate. In this condition, the film can survive contact loads approaching the static load capacity of a rolling element bearing. Lead coatings have had good success as a solid lubricant in vacuum applications and additionally it is used extensively as a solid film lubricant for the high speed bearing in imaging X-ray tubes under vacuum. Optimum performance of lead and other metals is achieved at approximately 1 um thickness. Silver and indium have been investigated too, but actual usage in space is not reported. Solid lubricant films are used in a variety of mechanisms on various spacecraft and launch vehicles. Deposition of soft metals (Pb, Au, Ag, In) by ion plating provides excellent adhesion. These films have been particularly effective in spacecraft bearings found in solar array drive mechanisms in European satellites, on the Hubble space telescope and the BAXS gear for the International Space Station solar collector gear drive. Gold and silver are used in situations requiring electrical conductivity as well. Sputter-deposited $MoS_2$ has a lower coefficient of friction than ion-plated Pb 0.01 versus 0.1, which means that $MoS_2$ components should develop less torque.

There are other lubricant materials that have been reported, but they only find application in limited conditions. For example, $CaF_2$, $BaF_2$ and cesium oxythiomolybdates/tungstates have been used for high temperature lubrication. They become soft and their shear strength decreases as the temperature increases.

Today there are many industrialized methods of solid film lubricant deposition for extreme environments. The general categories in order of increasing cost, complexity and adhesion are as follows:

Burnished Powders
Painting with VOC and Binders
PVD Vacuum Deposited

Burnished Powders; Solid film lubricants or other functional materials are mixed and placed on a carrier material such as a cloth, blasting media, inert media or specially designed fixtures. The parts to be coated are then brought in contact with the various media resulting in a film of the solid lubricant on the surface of the part. The lubricant material is marginally adherent to the surface of the part with a mechanical bond at best.

Painting Methods; Solid film lubricants or other functional materials are mixed with organic solvents as well as binders and parts are coated by paint spray guns, dipping or spin coating. Parts must be grit blasted prior to coating. Blasting results in surface finish degradation as well as fatigue from stress risers. Once the parts have been coated an oven bake out procedure is required to evaporate the solvents as well as cure the binders. These methods require the use of VOC's, and are not environmentally friendly. The bond between the solid film lubricant and the part to be coated is limited by the mechanism of the binder and how well it can glue the solid film lubricant to the surface; this bonding is not very strong and the resultant coating can become thick and affect part tolerances. The binders tend to introduce impurities and increase the coefficient of friction of solid film lubricants versus their pure form.

Vacuum Methods; Solid film lubricants or other functional materials are Physical Vapor Deposited (PVD) using sputter or ion plating deposition. Parts are placed in a chamber which is evacuated of atmospheric gases by pumps. The functional material cathode is bombarded by ions to dislodge the coating on an atomic scale on to the surface of the parts to be coated. This coating tends to have strong bonding to the part due to the purity of the process but requires expensive equipment and complex process control. Limitations exist on the size and shape of the parts to be coated based on the chamber size as well as ability to effectively manipulate the part for this line of sight process.

Solid film lubricants are critical for providing low friction surfaces especially in extreme environments. There exist many patents for applying solid film lubricants in special applications found across the majority of industry. Examples include automotive, internal combustion engines, aerospace, gas turbine engines, molding, glass manufacturing, welding, swaging, bearings, cabling and conveyor systems, cutting and forming tools; and many others. The primary methods of solid film lubricant deposition includes spraying, dipping, rubbing, tumbling or brushing. With these primary deposition methods the solid film lubricant must be added to another medium such as epoxy, resin or wax or grease to achieve some level of adhesion to the part being coated; additionally a post oven bake is required. The addition of such binders results in films which are thick and often brittle. An alternative method is to add solid film lubricants to metallic particles and then to use thermal spray methods to deposit low friction coatings. This method results in only a mechanical bond and often post coating grinding and or polishing is required. Some technologies apply solid film lubricants to the surface of parts by mechanical impingement using sand blasting equipment or tumbling polishing equipment however bonding is very weak and surfaces must be roughened prior to coating to create divots to hold the solid film lubricant. Methods based on PVD do achieve atomistic adhesion and a thin film structure with excellent tribological characteristics however these PVD sputtering process requires expensive vacuum equipment and sophisticated process controls. Solid film lubricants deposited by PVD have the ultimate performance capabilities as well as the smallest market share.

Thus, there is need and market for a method to durably attach a functional layer to an object having one or more surfaces or to a substrate, that overcomes the above prior art shortcomings.

There has now been discovered a method for adhering a functional layer to a substrate or 3-D article, by a convenient and low cost method along with a novel product, the laminate so formed.

SUMMARY OF THE INVENTION

Broadly the present invention provides, a method for durably bonding a layer to a substrate comprising,
  a) mounting a bond layer selected from the group consisting of a soft oxide, a soft metal, a sulfide and a chalcogenide to the substrate and
  b) mounting a functional layer onto the bond layer.

The invention further provides a product with a durably attached functional layer comprising,
  a) a substrate,
  b) a bond layer selected from the group consisting of a soft oxide, a soft metal, a sulfide, a chalcogenide and a combination of two or more thereof mounted on the substrate and
  c) a functional layer mounted on top of the bond layer to provide a durably bonded laminate.

DEFINITIONS

By engineering materials, as used herein, is meant shaped wood, metal, plastic, elastomer, including rubber, ceramic, coating or composite of one or more thereof.

By a soft oxide, as used herein, is meant a material with a hardness below 6 GPa.

By soft metal, as used herein, is meant one with less than 4 GPa.

By functional layer, as used herein, is meant a material layer that provides new or additional function to a laminate layer or substrate.

By bonding materials or functional materials, including lubricants, suitable for burnishing, as used herein, is meant powder, as described below, that will, at least in part, transfer during contact to the substrate being burnished.

By burnishing, as used herein, is meant to rub a material onto another such as through a ball mill whereby a material rubs another with the agent to be burnished between them—as in a ball colliding with a plate with powder between them; rubbing or polishing (including by hand), or by use of a buffing wheel to burnish an article or surface or by kinetic means in which the particle or powder velocity itself causes the particle to rub against and coat another material or surface.

By burnishing means, as used herein, is meant macro size components used to perform the above burnishing steps, such as metal balls, including ball bearings, marbles or plastic balls, of suitable size for the application, e.g., having a diameter of 1/32" to 1/2" or more and even irregular sized components, such as walnut shells, that can perform the burnishing steps described above, which can be performed, e.g., in a rotating drum, at a suitable speed or one that vibrates or a combination thereof, as desired.

By a powder, as used herein, is meant a well divided solid having a particle size of 1 nm to 500 µm or more depending on the application. The burnishing agent can be a powder (or compacted powder) that is rubbed onto a surface to coat same, as indicated, e.g., in FIGS. 1-6, less FIG. 2 hereof.

By a bond layer, as used herein, is meant a material that is itself adherent to a substrate and enhances adhesion of subsequent layers such that a functional layer is tenaciously bonded to a substrate through a bond layer.

Burnishing aside, the functional layer can be deposited on the bond layer (of, e.g., $Sb_2O_3$) by other methods, such as by magnetron sputtering, thermal spray or other suitable deposition methods, though burnishing is a preferred low cost, convenient method.

The bond layer can be deposited by methods or combination of methods, such as by PVD or magnetron sputtering or CVD or, thermal spray or other suitable deposition methods including electro or electroless plating, sol-gel, e-coat powder painting, conventional spray, dip or brush, though burnishing is a preferred low cost, convenient method.

The functional layer can be deposited on the bonding layer (of, e.g., $Sb_2O_3$) by other methods or combination of methods, such as by PVD or magnetron sputtering or CVD, thermal spray or other suitable deposition methods including electro or electro-less plating, sol-gel, e-coat powder painting conventional spray, dip or brush, though, again, burnishing is a preferred low-cost, convenient method.

BRIEF DESCRIPTION OF THE DRAWINGS

The invention will become more apparent from the following detailed specification and drawings in which.

DESCRIPTION OF PREFERRED EMBODIMENTS

Figure 1:
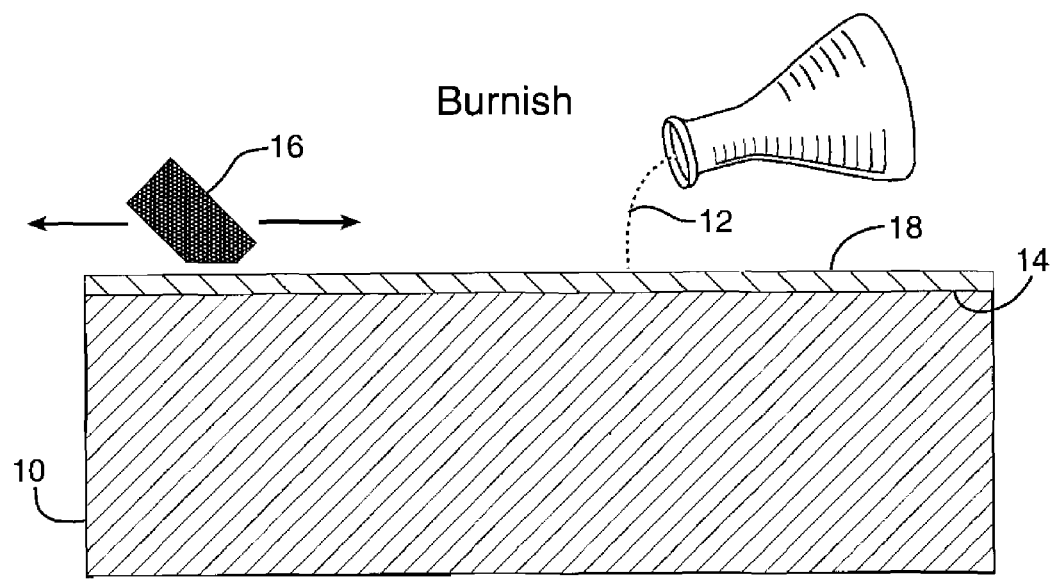
FIG. 1 is an elevation schematic view showing a method step embodying the present invention.
Figure 2:
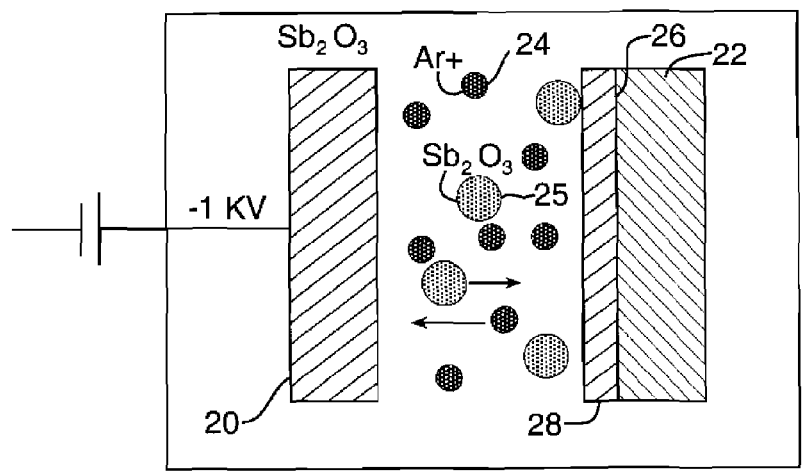
FIG. 2 is a fragmentary elevation schematic view showing an alternate method step embodying the present invention.

Referring now in detail to the drawings, examples of applying a bond coat to the surface of a substrate are shown in FIGS. 1 & 2. That is, on a substrate 10, a precursor bondable powder 12 is applied to the surface 14 of the substrate 10, as shown in the FIG. 1. Such layer 12 is in the form of $Sb_2O_3$ powder which, after application to the surface 14, is burnished thereon by burnishing tool 16 to form bond coat 18, as shown in FIG. 1.

Alternatively, within the scope of the present invention, such bond coat can be applied to a substrate by a non-burnishing method, such as sputtering, as shown in FIG. 2. That is, an electrode 20 of $Sb_2O_3$, is spaced from a substrate 22 in an atmosphere of Argon, the ions 24 of which are attracted to the $Sb_2O_3$ electrode, which frees $Sb_2O_3$ ions, which are attracted to the surface 26 of substrate 22, causing $Sb_2O_3$ to coat said surface 26 with a bond coat 28, as shown in FIG. 2 hereof.

Figure 3:
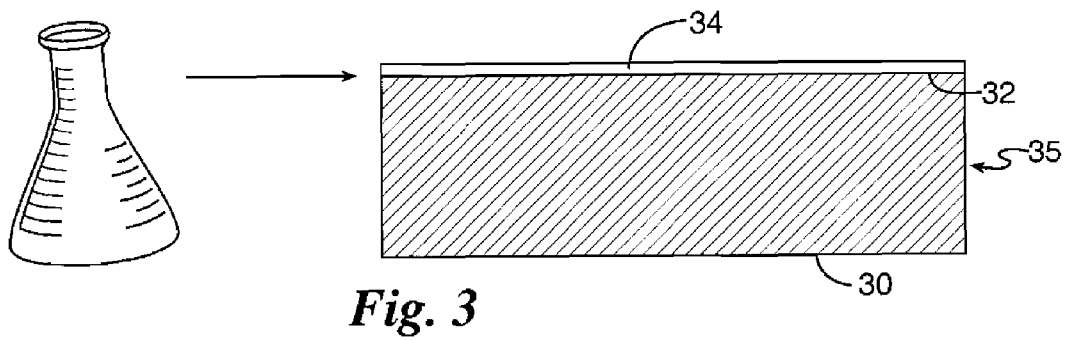
FIG. 3 is an elevation schematic view of a first step embodying the inventive method.

In a further embodiment of the method of the invention, substrate 30 has on its surface 32, a bond coat 34 of $Sb_2O_3$, per FIG. 3, formed by either of the methods described above with respect to FIGS. 1 & 2.

Figure 4:
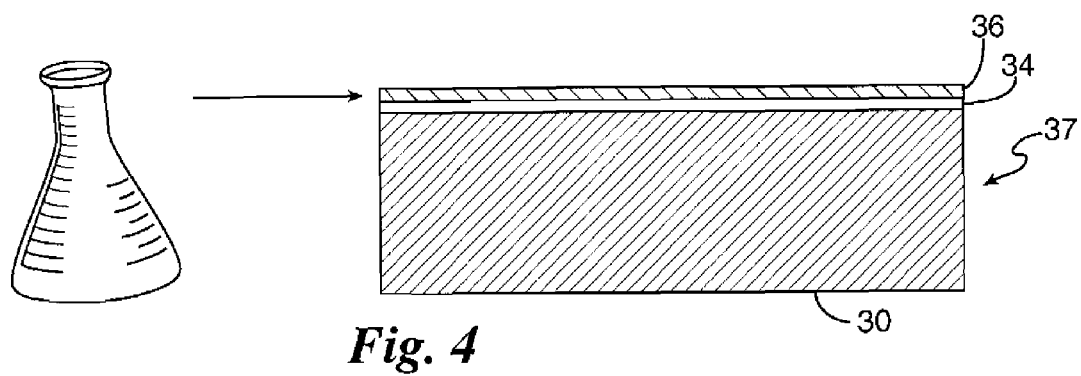
FIG. 4 is an elevation schematic view of a second step embodying the inventive method.

Then, as shown in FIG. 4, a functional layer, such as a solid layer of lubricant 36, is deposited on the bond coat 34, which holds the lubricant layer 36 in a strong durable bond, a bond, which would not be durable without the bond coat 34 provided by the method of the present invention, which also provides the novel products of the present invention, i.e., the durably bonded laminate 35 of FIG. 3 and the durably bonded laminate 37, per FIG. 4 hereof.

Figure 5:
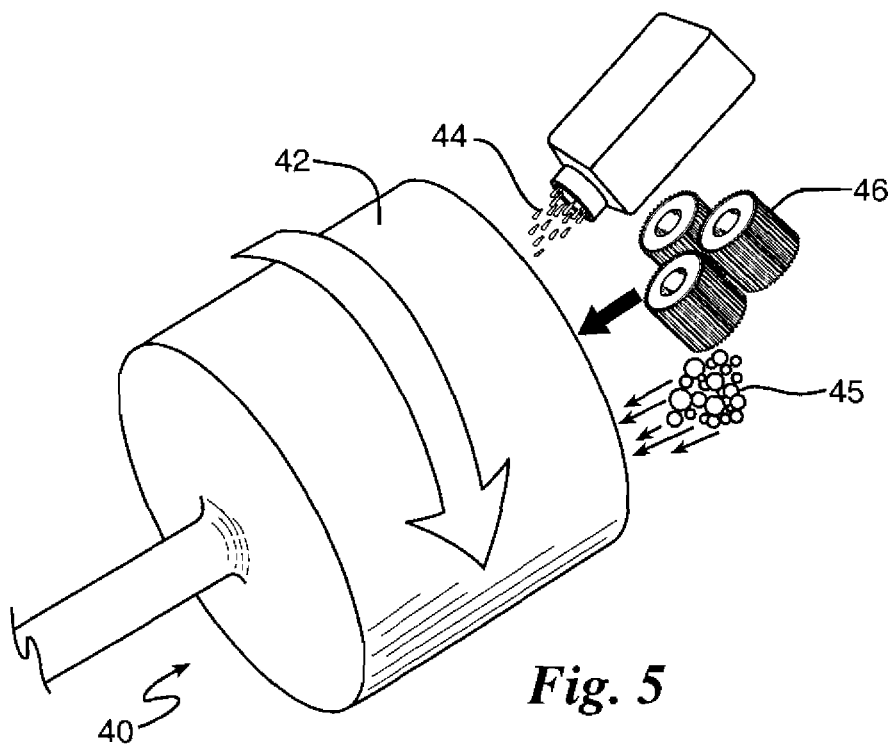
FIG. 5 is a fragmentary perspective schematic view of a first step of another embodiment of the inventive method and FIG. 6 is a fragmentary perspective schematic view of a second step of another embodiment of the inventive method.
Figure 6:
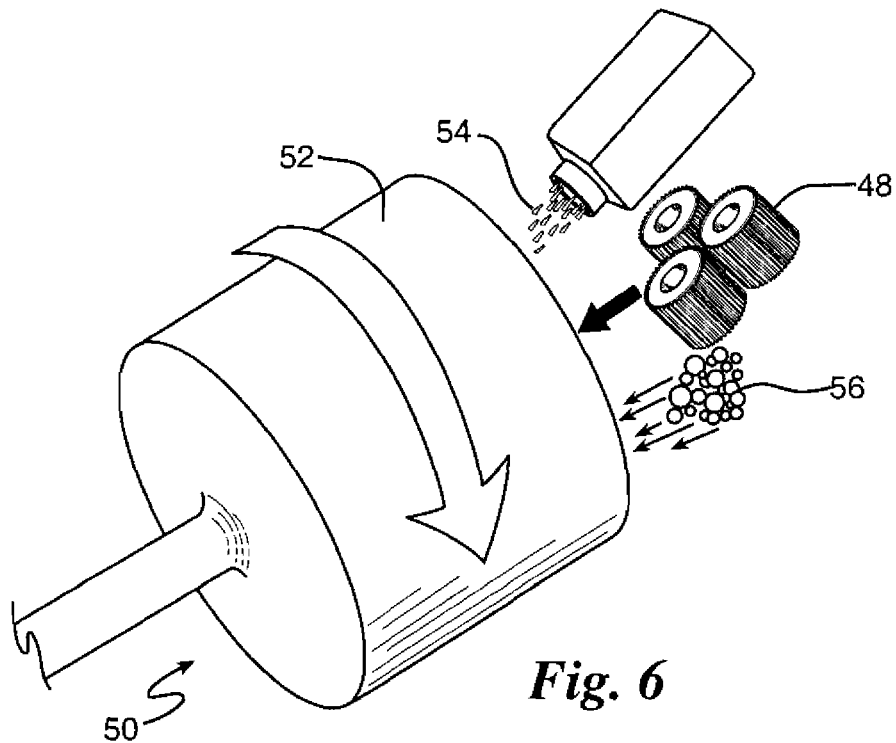

Also, per the invention, 3-D articles can be coated in a production system by machinery, such as shown in FIGS. 5 and 6. That is, ball mill 40, having rotatable drum 42, receives $Sb_2O_3$ bonding material 44, milling beads 45 and gears 46, the objects to be coated per FIG. 5 hereof.

The drum 40 is rotated, as shown in FIG. 5, which causes the bonding material 44 to contact the gears 46 and the beads 45 to come into repetitive contact with bonding material and gears so as to coat, burnish and build up a coating of $Sb_2O_3$ on the gears 46 in a manner similar to the bond coat 34, shown on substrate 35 in FIG. 3.

Thereafter, the now bond-coated gears 48 are transferred to the second coating stage, ball mill 50, having rotatable drum 52. Here, the coated gears 48 are placed in the drum 52 along with functional material, such as lubricant 54 and beads 56. The drum 50 is rotated, as indicated in FIG. 6, and, in the manner described above the drum 40, the lubricant material 54 is coated and burnished upon the coated gears 48, to build up the lubricant as a second coating thereon, in a manner similar to the buildup of functional layer 36 on substrate 37, per FIG. 4 hereof.

Thus, numerous 3-D objects or articles can be coated with the above layers or coatings by ball mills, a vibratory or other machine, in a mass production system per the invention.

Thus, the invention provides a substrate with a bond coat thereon, as an intermediate layer (as a first laminate), which layer can receive and hold fast, an added layer mounted on such bond coat (as a second laminate). The added layer can be a functional layer, such as a solid lubricant layer or other functional layer as described herein.

The inventive method can be a non-vacuum, ambient temperature, deposition process that does not involve binders, adhesives, curing or baking. However, applying the soft bond coat material (e.g., $Sb_2O_3$) by any method (including vacuum methods) provides benefit. A significant advantage of the bond coat is that it allows the lubricant to be deposited by burnishing and still provide low friction and long life wear protection. The chemical/physical bonding insures that the coating does not chip, crack or peel. Industrial friction and wear testing of this molecular bonding of solid film lubricants has demonstrated the superlative nature of this process.

The thickness of the bond layer herein or the functional layer herein is related to the particle size employed in the respective layers. Thus, the particle size influences the layer thickness and so the range of each can be from 1 nm to 500 µm, depending upon the application of the functional coating. That is, the bond coating and the functional coating can be smaller or less thick where the functional coating is a lubricant and of greater thickness where the functional coating is a catalyst. Within the above range, a preferred range of the respective layers, as noted above, is 0.5 to 3.0 µm thick, which includes about 1 µm, which will not affect part tolerances.

The basic process is as follows:
1. Surface of the substrate is properly cleaned of surface contaminants
2. The clean surface can be further activated as appropriate, acid for metals and ceramics and plasma treatment for composites and plastics
3. A thin layer of a soft oxide material such as $Sb_2O_3$ is burnished on to the surface such that a uniform film is produced.
4. This can be done by many methods:
   a. Rubbing with soft clothes
   b. Vibratory tumbler with media such as ceramic, wood, corn, plastic, steel, and the like
   c. Brushing including sonic brushes
   d. Dipping
   e. Spin coating
   f. Spraying using conventional paint methods or electrostatic methods
   g. Warm Spraying or thermal spraying
   h. Plasma PVD or CVD
   i. Sol-Gel
   j. Blast impingement
   k. Buffing wheels
   l. Any loose, non-adherent material is cleaned off The solid film lubricant is then deposited on top of the soft oxide bond layer film.

The solid film lubricant can be $MOS_2$, $WS_2$ (the dichalcogenides in general), ZnO (and oxides in general) boron nitride, $CaF_2$, graphite and mixtures of these solid lubricants as well as performance enhancing additives, PTFE or any other friction reducing material The solid film lubricant can be deposited by a similar method as the bond treatment This can be done by many methods, for example:
   a. Rubbing with soft clothes
   b. Vibratory tumbler with media such as ceramic, wood, corn, plastic, steel, and the like
   c. Brushing including sonic brushes
   d. Dipping
   e. Spin coating
   f. Spraying using conventional paint methods or electrostatic methods
   g. Warm Spraying or thermal spraying
   h. Plasma PVD or CVD
   i. Sol-Gel
   j. Blast impingement
   k. Buffing wheels
   l. Any loose, non-adherent material is cleaned off.

Thus, a significant advance in the performance of solid film lubricants has been made by the discovery of coating deposition processes for selected materials that results in higher adhesion and higher performance (lower friction and reduced wear) than PVD deposited coatings. PVD is generally considered the gold standard. It is this advancement that is the subject of this invention: a novel surface treatment method by which functional coatings such as adaptive and conventional solid film lubricants can be bonded to engineered materials with superior adhesion.

The method of the invention thus creates a bond coat for applying solid film lubricants or other functional coatings to the surface of engineered materials. The process is useful with selected materials that create good lubricant bonding and allows the lubricant to spread and be trapped in reservoirs and otherwise act synergistically with the bond coat to lower friction and wear. For example, antimony trioxide (material part of the process-material pairing) can be burnished (process) onto an engineering component. $MoS_2$/graphite/$Sb_2O_3$ (lubricant) mixtures, for example, can then be burnished on top (of the inventive bond layer herein, including $Sb_2O_3$), forming an adherent, long life, low friction surface. Without the surface treatment (i.e., without the bond layer of the invention), the system fails quickly. Using the same lubricant and applying by PVD, the lifetime improves, but considerable cost and loss of flexibility is incurred. Deposition of the soft bond layer material can be accomplished by a variety of methods, both chemical and physical in nature. The material can be deposited by rubbing a rotating part or rotating applicator, by brushes, wheels or polishing tables. A vibratory tumbler or rocking shaker can be used as well as spraying, thermal spraying or dipping techniques. Burnishing $Sb_2O_3$ on to a surface is one embodiment that is convenient, low cost and provides durable benefit.

As previously noted, solid film lubricants have shown great success in providing lubrication and wear protection in a broad range of industries as well as applications; specifically in harsh environments where conventional liquid or grease based lubricants cannot be used. The limiting factor of solid film lubricants has often been poor adhesion. Historically to achieve adhesion parts had to be roughened by blasting or binders and solvents had to be used with oven bake procedures, all resulting in marginal adhesion of the solid film lubricant to the substrate. An alternate method has been to use vacuum plasma based technologies with high expense, process complexity and limitation on the size of parts. The subject of this invention provides durable adhesion of solid film lubricants and a synergistic effect is achieved, creating a low friction, low wear and a long lived lube surface. A significant advantage of the burnished $Sb_2O_3$ embodiment is that it is convenient, an environmentally friendly process, scalable and permits the lubricant to be burnished (inexpensive, environmentally friendly and scalable) onto the surface. A burnished lubricant that is as effective or more so, than PVD or CVD lubricant coatings at a significant cost savings.

As indicated, a novel surface deposition method for selected materials is provided, which enables lubricants and other functional materials to be applied to engineered surfaces with surpassing adhesion and enhanced lubricant properties. A focus of this invention has been on solving tribological problems by the use of solid film lubricants. Another industry that can benefit from this bonding process of materials in powder form is electroluminescent materials for sensors, detectors, scintillators and displays.

Thus a low cost method is provided that, in one embodiment, prepares a surface to tightly bond a coating, such as a lubricant layer, that lowers friction and protects such surface from wear. In addition, the bond coat process and materials act synergistically with the lubricant to provide markedly improved properties. Essentially, a bond layer is created that chemically and physically bonds lubricants to a substrate (e.g., $MoS_2$, $WS_2$ (the dichalcogenides in general), ZnO (and oxides in general), boron nitride, cesium oxythiomolybdate, $CaF_2$, graphite and mixtures of these solid lubricants), that results in improved adhesion, lubricant availability, lower friction and extended lifetime thereof. Materials adhere better and the lubrication mechanism is enhanced as the lubricant spreads and remains on the coated surfaces. The process and bond coat work on various substrates, including, metals, ceramics, plastics, composites and engineered materials in general.

Lubricants that adhered poorly to these substrates before application of the inventive process/coating, adhere tenaciously afterwards. The process extends the life of coatings and lowers friction by several orders of magnitude compared to depositing coatings without the bond layer. One embodiment of the invention permits bonding by a method of burnishing a special oxide such as antimony trioxide. The bonding has superior characteristics to even plasma vacuum technologies, which is a complex and expensive process. The invention permits the lubricant coat to be applied by burnishing and yet provide the superior performance of PVD coatings. The burnishing process is significantly less expensive than vacuum based processes. The process in this invention can be described as a non-vacuum, ambient temperature, deposition process that does not involve binders, adhesives, curing or baking—no hazardous solvents or hazardous air pollutants. However, temperatures above and below the ambient can be employed in the coating steps herein, as desired, within the scope of the invention.

As previously noted, the invention provides a coating that does not chip, crack or peel. The final functional coating is preferably about 1 μm thick (with a range of 0.5-3.0 μm), which will not affect part tolerances. Industrial grade friction and wear testing of solid film lubricants has demonstrated the superlative nature of this process. Solid film lubricants have shown great success in providing lubrication and wear protection in a broad range of applications and would benefit many industries. Benefits are specifically notable in harsh environments where conventional liquid or grease based lubricants can not be used. It is also noted that the process is inexpensive, environmentally friendly and uncomplex compared to other methods used to achieve improvements in solid lubricant performance. A limiting factor of solid film lubricants has been poor adhesion and limited lifetime. Historically, to achieve adhesion, parts had to be roughened by blasting or binders and solvents had to be used with oven-bake procedures, all resulting in marginal adhesion of the solid film lubricant to the substrate. An alternate method has been to use vacuum plasma based technologies with high expense, process complexity and limitation on the size of parts. The subject of this invention provides strong adhesion of solid film lubricants in a synergistic manner creating a low friction, low wear, and long life surface. The process is completely scalable to large and complex parts.

An entire industry exists for solid film lubricants. They are deposited by conventional "paint" methods (i.e., in a binder), or by complex vacuum methods. Nothing in the current art or science has the adhesion, cohesion and performance characteristics as does the subject of this invention. A number of bond coats are used, but none are burnished, which is key, none are soft oxides or other burnishable soft compounds—in particular none are antimony trioxide. Bond coats described outside this invention include metals and phosphate treatments, but again, not burnished oxides and soft materials.

The method of the present invention applies to enhancing moving mechanical components in standard or harsh environments such as gas turbine engines, rocket engines, space-based mechanisms, munitions; anywhere a low friction and low wear surface is required. Gears, splines, bearings, deployable structures (particularly in space), bushings, guides, slides, shafts, rings, pins, pistons, camshafts, hinges, seals are all components where this invention can find use.

In sum, reducing friction and wear has a tremendous payoff, for any application involving moving mechanical components needs lubrication. Extending the realm of solid film lubricant applications by providing a process that joins solid lubricants to functional surfaces has windfall effects through out all of industry. One-third of all usable, device-produced energy is lost to friction and wear and reactive maintenance costs three times that of planned maintenance, costing industry and consumers billions each year.

Finally, while durably mounted lubricant layers are an important embodiment of the present invention, other functional layers are provided, per the invention, such as hard particle durable material, anti-corrosion compound, catalyst, photosensitive material, adsorbent, photovoltaic material, and sensor compounds.

What is claimed is:

1. A durably attached product, comprising:
   a) a metal substrate;
   b) a bond layer of antimony oxide mounted on said substrate, said bond layer being substantially binder-free to permit direct contact of said bond layer with said substrate;
   c) a functional layer of a graphite powder lubricant on top of said bond layer; and,
   d) wherein said graphite powder lubricant comprises a mixture of: graphite/$Sb_2O_3$ and $MoS_2$; or, graphite and $MoS_2$.

* * * * *